No. 879,231. PATENTED FEB. 18, 1908.
F. M. WRABEK.
EXCAVATING MACHINE.
APPLICATION FILED NOV. 5, 1907.

2 SHEETS—SHEET 1.

Witnesses

Frank M. Wrabek, Inventor

By
Attorneys

No. 879,231. PATENTED FEB. 18, 1908.
F. M. WRABEK.
EXCAVATING MACHINE.
APPLICATION FILED NOV. 5, 1907.

2 SHEETS—SHEET 2.

Witnesses

Frank M. Wrabek. Inventor

By C. A. Snow & Co.

Attorneys

UNITED STATES PATENT OFFICE.

FRANK M. WRABEK, OF LESUEUR CENTER, MINNESOTA.

EXCAVATING-MACHINE.

No. 879,231.     Specification of Letters Patent.     Patented Feb. 18, 1908.

Application filed November 5, 1907. Serial No. 400,870.

*To all whom it may concern:*

Be it known that I, FRANK M. WRABEK, a citizen of the United States, residing at Lesueur Center, in the county of Lesueur and State of Minnesota, have invented a new and useful Excavating-Machine, of which the following is a specification.

This invention relates to excavating machines, and has for its principal object to provide a machine of novel construction for the digging of trenches, ditches, or for dredging purposes.

One of the principal objects of the invention is to provide an excavating device of the endless chain type, in which provision is made for adjusting the depth of cut as well as adjusting the angle of the side walls of the cut, so that the bank may be cut away at the required angle in proportion to the depth and the angle of cut maintained the same throughout the entire length of the excavation.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

Figure 1:
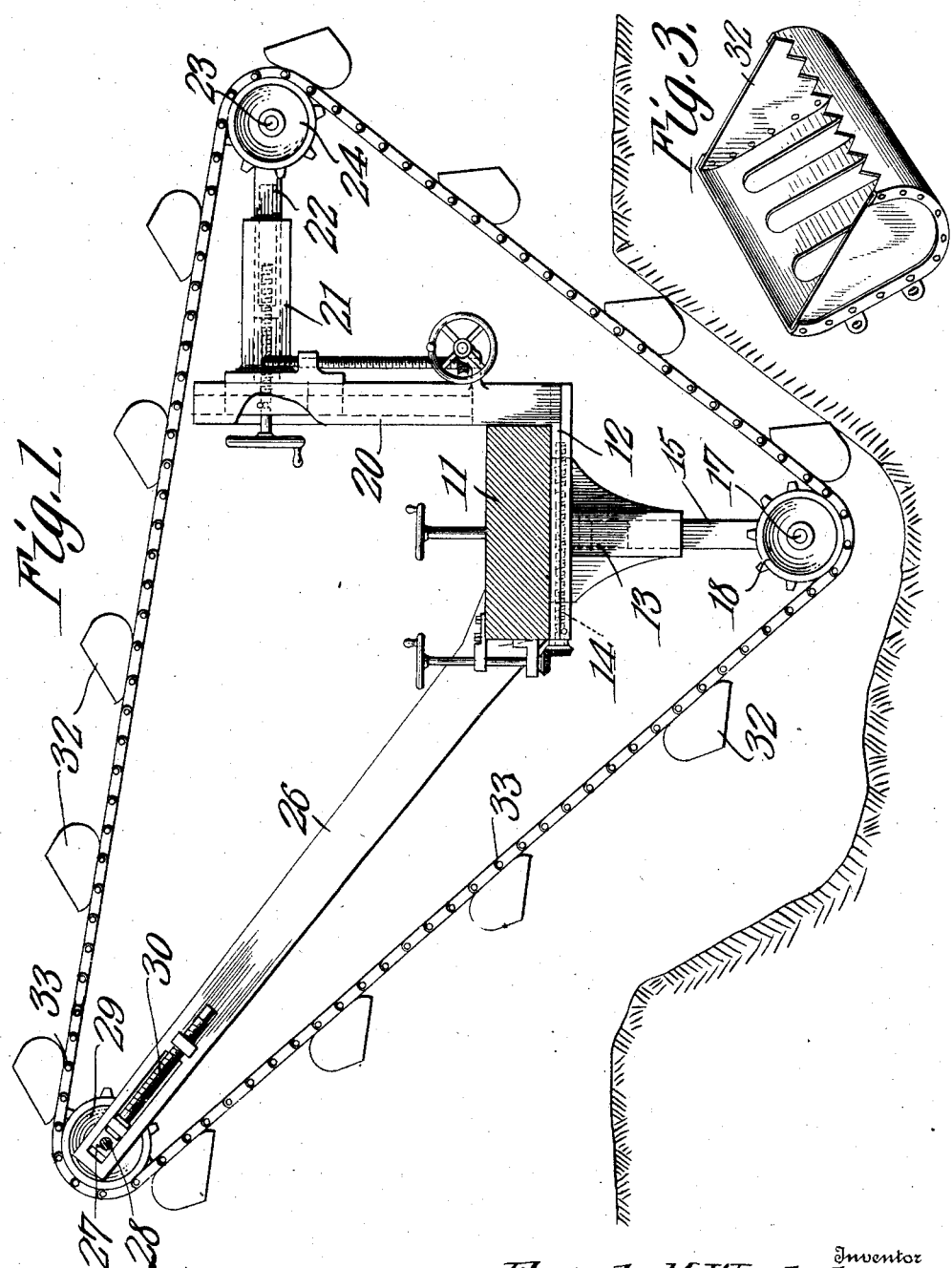
Figure 2:
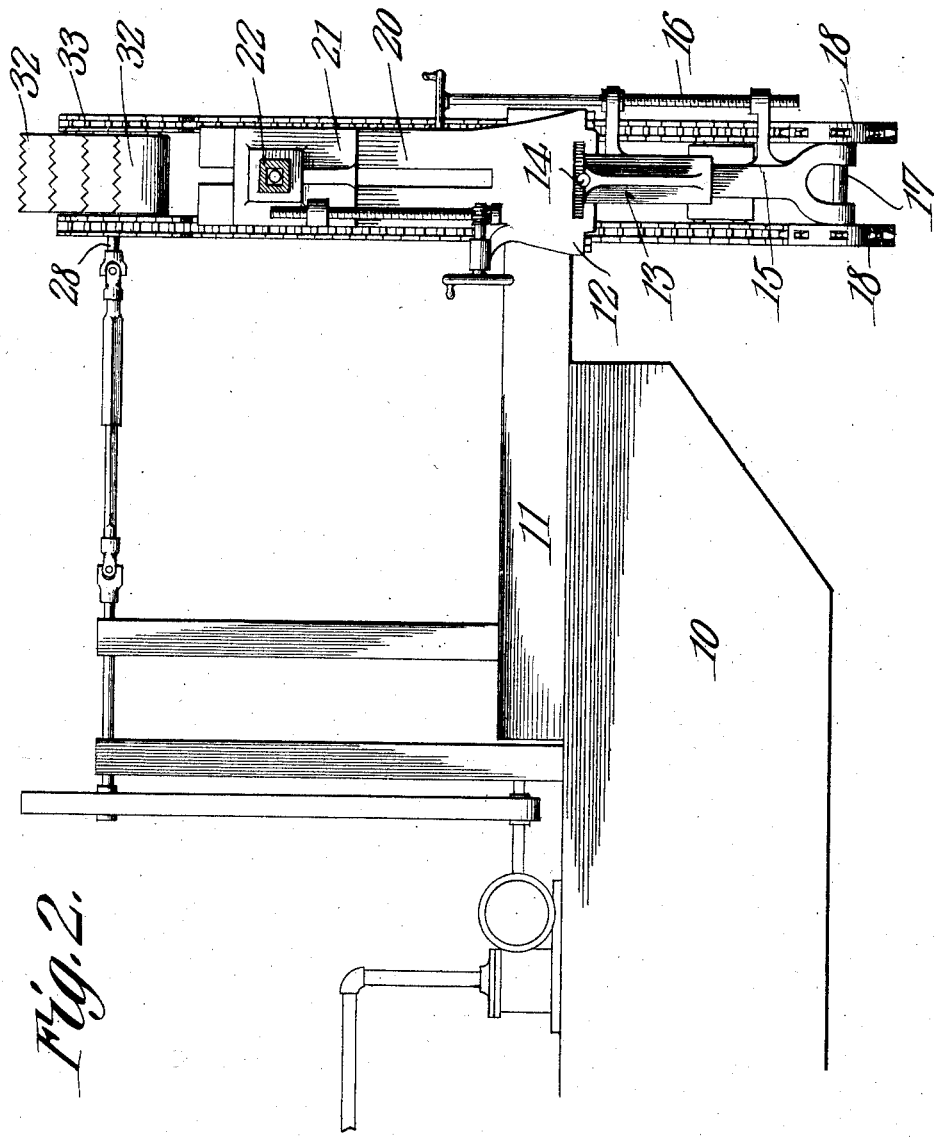

In the accompanying drawings:—Figure 1 is an end elevation of an excavating machine constructed in accordance with the invention. Fig. 2 is a plan view of the same. Fig. 3 is a detail perspective view of one of the buckets.

Similar numerals of reference are employed to indicate corresponding parts throughout the several figures of the drawings.

The mechanism is carried by any suitable support which may be in the form of a wheeled car where the device is to operate on land, or it may be in the form of a vessel for ditching or dredging operations.

From the forward end of the carrier or support 10 extends a beam 11, to the bottom of which is secured a horizontally disposed guide 12 extending transversely of the beam and arranged to receive a carriage 13. This carriage may be adjusted laterally of the beam and any suitable adjusting means, such, for instance, as a screw 14, may be employed for the purpose. The carriage 13 carries a second vertically adjustable carriage 15 which may be raised and lowered by means of a screw 16, and at the lower end of this carriage 15 is a shaft 17 carrying a pair of sprocket wheels 18. The construction of the parts as described is such that the shaft 17 may be raised and lowered and may be adjusted horizontally.

Secured to one side of the beam is a guide 20 on which is arranged a vertically adjustable carriage 21, and this carriage 21 carries a second carriage 22 that is adjustable laterally of the machine. The carriage 22 carries a shaft 23 on which are mounted a pair of sprocket wheels 24, and said carriage 21 may be adjusted both vertically and horizontally.

Extending from the beam 11 is an arm 26, the outer end of which is provided with an elongated slot for the reception of a bearing block 27, in which is mounted a shaft 28 carrying a pair of sprocket wheels 29. The block 27 may be adjusted lengthwise of the slot by means of a suitable screw 30, the extent of adjustment depending on the adjustment of the two shafts 17 and 23.

Extending over the several sprocket wheels 18, 24 and 29, is a link belt or belts, two of such belts being shown in the present instance, and these belts carry buckets 32, which may be secured in place in any suitable manner, as by providing the links of the belt and the bucket with ears or lugs that are connected by transverse pins 33. This mechanism is arranged in advance of the carrier 10, and when the link belts are operated, the buckets will dig into the dirt as they travel between the sprocket wheels 18 and 24, and will carry the dirt over the sprocket wheel 29, the latter wheels being arranged in a vertical plane beyond the side of the cutting, so that the dirt may be deposited in such position as to prevent its falling back into the excavation.

The shaft 17 may be adjusted vertically in order to control the depth of cut, and the two shafts 17 and 23 may be adjusted laterally of the machine in order to alter the angle of the link belts as they pass from the sprocket wheels 18 to the sprocket wheels 24, so that the angle of the side wall of the cut may be adjusted as desired, the angle being varied in accordance with the character of the wall and the nature of the excavation.

In order to effect the desired adjustment, the screw 30 is first loosened in order to allow the shaft 28 to move in the direction of the beam 11 and thus slacken the link belts, so that the two shafts 17 and 23 may be moved to the desired position, and when this has been accomplished, the screw or screws 30 may be again turned in order to move the shaft 28 outward and tighten the belts.

The operating mechanism may be of any desired construction and driven in any suitable manner from an engine or other motor on the carrier 10. The connection between the motor and the shaft 28 which preferably is the driven shaft, is such as to allow the necessary adjustment of said shaft without interfering with the transmission of power.

While it is preferred to employ a pair of link belts to carry the buckets it is obvious that single belts may be used for the purpose and the belts attached to the buckets at a point midway of the ends of the latter.

The buckets 32 are preferably of the construction shown in Fig. 3, each bucket having a toothed digging edge and being preferably provided with bottom openings in order to permit the escape of liquid matter.

I claim:—

1. In a machine of the class described, a support, a plurality of sprocket wheels, an endless belt excavator guided around said sprocket wheels, and bearings carrying said sprocket wheels, each of said bearings being adjustable independent of each of the other bearings.

2. In a machine of the class described, a support, a pair of double carriages carried by the support, the primary and secondary members of each carriage being adjustable at an angle to each other, sprocket wheels supported by the secondary members of the carriage, a third sprocket wheel adjustable independently of the other two, and an endless belt excavator extending around said sprocket wheels.

3. In a machine of the class described, a support, a beam projecting therefrom, vertical and horizontal guides on said beam, primary carriages mounted in said guides, secondary carriages in the primary carriages and adjustable at a right angle to the direction of adjustment of the primary carriages, sprocket wheels carried by said secondary carriages, and an endless belt conveyer supported by said sprocket wheels.

4. In a machine of the class described, a support, a beam projecting therefrom, guides on the beam, primary carriages adjustable in the guides, secondary carriages adjustable on the primary carriages, shafts mounted in the secondary carriages, sprocket wheels on said shafts, a slotted arm projecting from the beam, a bearing block mounted therein, means for adjusting the bearing block, a shaft carried by said bearing block, a sprocket wheel on said shaft, link belts connecting the sprocket wheels, and excavating buckets carried by said link belts.

In testimony that I claim the foregoing as my own, I have hereto affixed my signature in the presence of two witnesses.

FRANK M. WRABEK.

Witnesses:
 HENRY D. BAXTER,
 JACOB A. KRENIK.